US005316277A

United States Patent [19]

Banks

[11] Patent Number: 5,316,277

[45] Date of Patent: May 31, 1994

[54] PORTABLE HYDRAULIC VISE

[76] Inventor: Willie E. Banks, 434 NE. Morris, Portland, Oreg. 97212

[21] Appl. No.: 44,797

[22] Filed: Apr. 12, 1993

[51] Int. Cl.[5] .......... B23Q 3/08

[52] U.S. Cl. .......... 269/25; 269/17; 269/76; 269/208; 269/279

[58] Field of Search .......... 269/17, 208, 209, 76, 269/268, 279, 280, 282, 283, 25, 147

[56] References Cited

U.S. PATENT DOCUMENTS

| | | | |
|---|---|---|---|
| 1,430,226 | 9/1922 | Goodreau | 269/208 |
| 3,464,095 | 9/1969 | Chambers | 254/107 |
| 4,560,151 | 12/1985 | Grundy | 269/17 |
| 4,736,927 | 4/1988 | Clancy | 269/147 |
| 5,064,178 | 11/1991 | Nimtz | 269/147 |
| 5,190,265 | 3/1993 | Barry et al. | 269/17 |

*Primary Examiner*—Robert C. Watson
*Attorney, Agent, or Firm*—James D. Givnan, Jr.

[57] ABSTRACT

A portable vise is disclosed including a beam along which a hydraulic cylinder assembly is positionable to adapt the vise to a wide range of work pieces. The hydraulic cylinder assembly includes a carrier slidably engaged with a beam flange and which is lockably engageable to the beam during a clamping operation. A lock or stop includes a pair of leg members insertable within a selected pair of beam defined apertures. The cylinder assembly includes a lever operated pump with a self-contained fluid reservoir. The beam is supported on a turntable in turn carried by a pedestal having a wheel equipped base. For clamping articles with curved surfaces, a pair of supplemental jaw plates are provided, each having an irregular clamping surface to assure positive engagement with a clamped article.

5 Claims, 1 Drawing Sheet

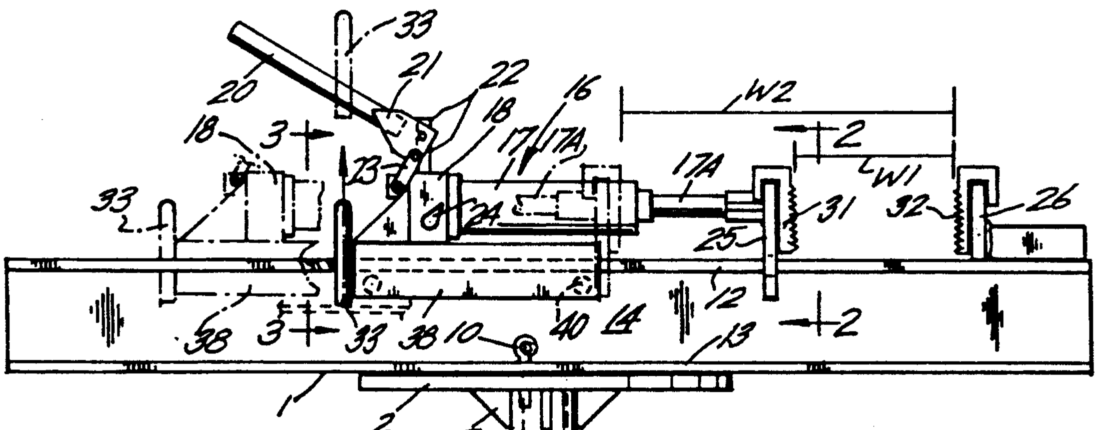
FIG. 1
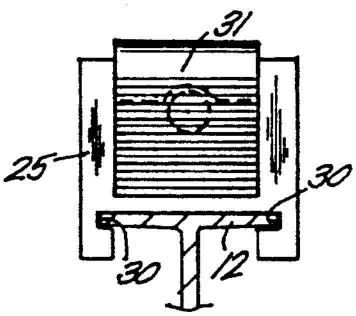
FIG. 2
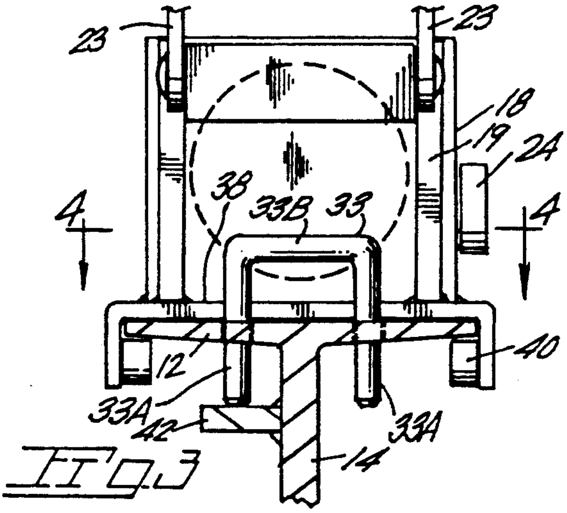
FIG. 3
FIG. 4
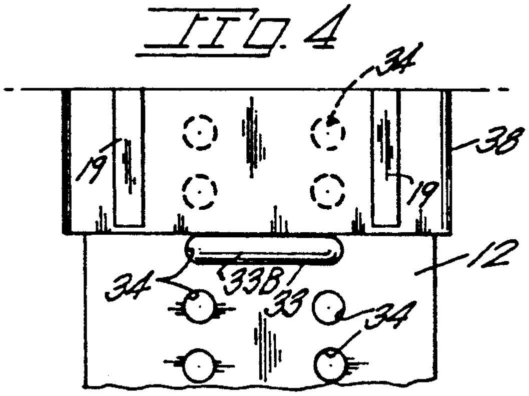

PORTABLE HYDRAULIC VISE

BACKGROUND OF THE INVENTION

The present invention pertains generally to industrial vises used in the temporary clamping of articles of widely varying widths.

In the processing of various sized articles, during which it is necessary to secure each of the articles for one or more operations, considerable time is spent in clamping of the work piece within vises of known construction. Prior art vises include both hydraulic and air actuated cylinders of considerable length to accommodate a wide range of work pieces. As the range of piston rod movement is necessarily substantial in such vises, a remote source of air or fluid pressure is normally utilized. A problem exists in providing a vise capable of handling a wide range of work piece sizes in those locations where such a source of hydraulic or air pressure is not available. For example, in the processing of salvaging or disassembling used equipment, it is highly desirable to have a vise readily positionable for use at several work sites not served by pressure supply conduits.

SUMMARY OF THE PRESENT INVENTION

The present vise is embodied in a pressurized cylinder in place on a carrier manually positionable along a beam with a stop selectively engageable with the beam to enable positioning of the carrier and the cylinder thereon throughout a wide range of positions for a wide range of work piece widths. The cylinder is manually pressurized to drive a piston and jaw thereon into clamped engagement with the work piece, with piston travel being necessary only during a clamping of the article as opposed to piston travel for sizing or spacing of the span between clamping jaws. A turntable is provided, about which the cylinder assembly, and beam supporting same, are positionable and lockable into place. A base of the vise is wheel supported for travel of the vise to a work site.

Important objectives of the present invention include the provision of a vise having a horizontal beam member along which a cylinder assembly and clamping jaw are readily positionable to receive a wide range of work piece sizes from a few inches to several feet; the provision of a vise including a hydraulic cylinder having a reservoir therein and a lever operated pump all positionable along a beam and lockable thereto by a positionable stop; the provision of a hydraulic vise having both a movable jaw and a fixed jaw, both of which may be provided with a detachable jaw having an irregular surface for gripping curved surfaces on a clamped article.

BRIEF DESCRIPTION OF THE DRAWINGS

In the accompanying drawings:

FIG. 1 is a front elevational view of the present vise;

FIG. 2 is a vertical sectional view taken along line 2—2 of FIG. 1;

FIG. 3 is a vertical sectional view taken along line 3—3 of FIG. 1, and

FIG. 4 is a horizontal sectional view taken along line 4—4 of FIG. 3.

DETAILED DESCRIPTION OF THE PREFERRED EMBODIMENT

With continuing attention to the drawing wherein applied reference numerals indicate parts similarly hereinafter identified, the reference numeral 1 indicates a beam in place on a table 2. A pedestal 3 supports the table and is in turn carried by a base 4, which is equipped with a pair of wheels 5, and a ground engaging block 6. The beam is positionable about the vertical axis of pedestal 3 and lockable by means of a locking pin 10 in the form of a pin extending through a beam flange and the turntable. A stub shaft 8 extends from the underside of beam 1 into pedestal 3. A lock 9 prevents separation.

The beam 1 is of I-beam stock and includes upper and lower flanges at 12 and 13, with a web at 14. A cylinder assembly is indicated generally at 16 and includes a cylinder 17 which may be of the signle acting type having a base mounted in place on a block 18, in which a reservoir is provided for hydraulic fluid. Braces 19 support block 18. A manually operated pump for actuating cylinder 17 includes a lever 20, having a pair of plates 21 thereon, which straddle and are pinned to a rod 22 which terminates in a pump piston in block 18. A pair of links at 23 serve to rockably mount lever 20 to permit reciprocating motion to be imparted to pump rod 22 for powering cylinder 17 for extension of piston rod 17*a*. A settable control at 24 directs fluid from the pump within block 18 to the base end of the cylinder during a clamping operation which conversely, when repositioned, permits exhaustion of fluid from the base of the cylinder upon manual retracting of piston rod 17*a* into the cylinder. From the foregoing it will be seen that rocking of lever 20 by the operator will impart reciprocal movement to rod 22 to pressurize the base end of cylinder 17 to extend rod 17*a* therefrom for biasing a jaw at 25 on the rod end into work piece engagement. The work piece is supported by a fixed jaw 26, secured to the upper portion of the I-beam. Movable jaw 25 is, as best shown in FIG. 2, shaped to slidally engage the parallel edge of I-beam flange 12 with a pair of recesses at 30 to restrain jaw 25 against upward displacement from the flange.

For the purpose of enhancing jaw engagement with work pieces having curved or rounded surfaces, such as, for example pipes, a pair of detachable or supplemental jaw plates are provided at 31 and 32. Each is formed with an angular upper end defining a bight for placement in a supported manner over the upper ends of permanent jaws 25 and 26.

For sliding engagement of the cylinder assembly 16 with beam 1 a carrier 38 is of inverted channel section with retainers at 40 preventing upward displacement of the carrier during vise use. Positioning of cylinder assembly 16 is accomplished manually prior to starting a clamping operation by the repositioning of cylinder assembly 16 along upper flange 12. A stop at 33 is of inverted U-shape having legs 33A positionable through a series of apertures 34 formed in two rows in beam flange 12. A leg 33A of lock 33 abuts a flange 42 on the beam web to assure the stop cross or upper portion 33B being offset upwardly from the beam and being easily grasped and lifted free of the beam during relocation of the cylinder assembly.

In a clamping operation the cylinder assembly 16 is slidably positionable along beam 1 to locate movable jaw 25, with or without detachable jaw 31 thereon, against one side of the work piece. Stop 33 is inserted into engagement with I-beam flange 12 with subsequent rocking of pump lever 20, causing pressurization of cylinder 17 and the advancement of jaw 25 into abutment with the work piece. Accordingly, sizing of the present vise to the work piece is quickly accomplished by manual positioning of carrier 38 without time consuming extension of piston rod 17A. As the present vise is adaptable to a wide range of work piece sizes such as at W1 and W2 by manual positioning of carrier 38 and cylinder 17 along the beam, the cylinder may have a short stroke as only the clamping function performed by the cylinder as opposed to both sizing and clamping functions being performed by the cylinder. Additionally, the present arrangement permits the present vise to dispense with the need for a separate external hydraulic reservoir.

For travel between work sites, the vise is lifted about the ground engaging wheels 5 and rolled thereon with subsequent ground engagement of block 6 preventing undesired displacement of the vise.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. In a vise for clamping articles of widely varying dimensions, the improvement comprising,

- a beam having a flange, a fixed jaw on said flange,
- a cylinder assembly on said beam including an elongate carrier manually positionable along said flange, a hydraulic cylinder and pump assembly on said carrier and including a movable jaw positionable relative said fixed jaw,
- a stop insertably engageable with said flange to prevent movement of the carrier during a clamping operation, said stop including a pair of legs insertably engageable with pairs of openings spaced at intervals along said flange and a handgrip integral with said legs facilitating removal and installation of the stop on said flange.

2. The invention claimed in claim 1 wherein said carrier includes an end for abutment with said stop.

3. The invention claimed in claim 1 wherein said hydraulic cylinder and pump assembly include a self-contained reservoir for hydraulic fluid.

4. The invention claimed in claim 1 additionally including supplemental jaws one each for suspended placement on said movable jaw and said fixed jaw, said supplemental jaws each having an irregular clamping surface.

5. In a vise for clamping articles of widely varying dimensions, the improvement comprising,

- a beam having a flange, a fixed jaw on said flange,
- a cylinder assembly on said beam including an elongate carrier manually positionable along said flange, a hydraulic cylinder and pump assembly on said carrier and including a movable jaw positionable relative said fixed jaw,
- a stop insertably engageable with said flange to prevent movement of the carrier during a clamping operation, said stop including means insertably engageable with said flange and a handgrip facilitating removal and installation of the stop on said flange, and
- said stop being of inverted U-shape, means limiting insertion of said stop to locate said stop in a raised position from the beam to facilitate removal of the stop from the beam during respositioning of the cylinder assembly.

* * * * *